(12) United States Patent
Kirk et al.

(10) Patent No.: US 11,726,491 B2
(45) Date of Patent: Aug. 15, 2023

(54) WIRE GUIDANCE AND REMOTE OPERATION FOR MATERIAL HANDLING VEHICLES

(71) Applicant: THE RAYMOND CORPORATION, Greene, NY (US)

(72) Inventors: John Bryant Kirk, Greene, NY (US); Erric Heitmann, Jamesville, NY (US); Steven Medwin, Haverstraw, NY (US); James Wilcox, Santa Fe Springs, CA (US); Jonathan William Hamlin, Champaign, IL (US)

(73) Assignee: The Raymond Corporation, Greene, NY (US)

( * ) Notice: Subject to any disclaimer, the term of this patent is extended or adjusted under 35 U.S.C. 154(b) by 513 days.

(21) Appl. No.: 16/280,871

(22) Filed: Feb. 20, 2019

(65) Prior Publication Data
US 2019/0258266 A1 Aug. 22, 2019

Related U.S. Application Data (60) Provisional application No. 62/632,760, filed on Feb. 20, 2018.

(51) Int. Cl.
*H04W 84/10* (2009.01)
*G05D 1/02* (2020.01)
*H04W 84/12* (2009.01)

(52) U.S. Cl.
CPC ......... *G05D 1/0265* (2013.01); *G05D 1/0219* (2013.01); *G05D 1/0234* (2013.01);
(Continued)

(58) Field of Classification Search
USPC ........................................................ 701/25
See application file for complete search history.

(56) References Cited

U.S. PATENT DOCUMENTS

| 937,976 | A | 10/1909 | Pescod |
| 3,470,474 | A | 9/1969 | Rohrer |

(Continued)

FOREIGN PATENT DOCUMENTS

| DE | 3916610 A1 | 12/1989 |
| WO | 2008057504 | 5/2008 |
| WO | 2009063387 | 7/2009 |

OTHER PUBLICATIONS

Abstract or "Chapter 2: Residential Network Architectures and Services" by Belal Hamzeh, Brian Hedstrom, David Hancock, Kenneth Gould, Kirk Erichsen, Niem Dang, Vikas Sarawat, Alireza Babaei, Mehmet Toy; Jan. 9, 2015 https://doi.org/10.1002/9781119000334.ch2 (Year: 2015).*

(Continued)

*Primary Examiner* — Cuong H Nguyen
(74) *Attorney, Agent, or Firm* — Quarles & Brady LLP (57) ABSTRACT

A material handling vehicle guidance system comprises a first conductive member, a second conductive member, and an electrical current source. The second conductive member is electrically coupled to the first conductive member and extends parallel to the first conductive member to define a loop. The first conductive member and second conductive member are coupled to a shielded cable connector. The electrical current source supplies current to the first conductive member in a first direction and supplies current to the second conductive member in a second direction opposite the first direction to produce a narrowcast radio frequency signal detectable between the first conductive member and the second member.

26 Claims, 5 Drawing Sheets

(52) U.S. Cl.
CPC ......... *G05D 1/0246* (2013.01); *G05D 1/0276* (2013.01); *G05D 1/0297* (2013.01); *G05D 2201/0216* (2013.01); *H04W 84/12* (2013.01)

(56) References Cited

U.S. PATENT DOCUMENTS

| | | | | |
|---|---|---|---|---|
| 3,594,571 | A | * | 7/1971 | Schonbrodt .......... G05D 1/0265 246/66 |
| 3,735,265 | A | | 5/1973 | Karaganis |
| 3,763,955 | A | * | 10/1973 | Schroder .............. G05D 1/0265 180/168 |
| 3,935,922 | A | * | 2/1976 | Cooper ................ A47L 11/4011 250/461.1 |
| 4,006,790 | A | * | 2/1977 | Kawano ............... G05D 1/0265 180/168 |
| 4,043,418 | A | * | 8/1977 | Blakeslee ................ B62D 1/28 180/168 |
| 4,044,853 | A | * | 8/1977 | Melke ..................... B62D 1/28 180/167 |
| 4,215,759 | A | * | 8/1980 | Diaz .................... G05D 1/0265 180/168 |
| 4,284,160 | A | * | 8/1981 | DeLiban ................. B62D 1/28 104/299 |
| 4,307,329 | A | | 12/1981 | Taylor |
| 4,322,670 | A | | 3/1982 | Taylor |
| 4,361,202 | A | * | 11/1982 | Minovitch ......... B60K 31/0008 104/88.02 |
| 4,486,694 | A | * | 12/1984 | Ohba ................... G05D 1/0265 180/168 |
| 4,520,889 | A | * | 6/1985 | Abe ........................ B62D 1/28 180/168 |
| 4,530,056 | A | * | 7/1985 | MacKinnon ......... G05D 1/0238 180/168 |
| 4,656,406 | A | * | 4/1987 | Houskamp ........... G05D 1/0265 180/167 |
| 4,780,817 | A | * | 10/1988 | Lofgren ............... G05D 1/0265 180/168 |
| 4,791,570 | A | * | 12/1988 | Sherman .............. G05D 1/0265 180/168 |
| 4,819,758 | A | * | 4/1989 | Greene ................ G05D 1/0255 180/168 |
| 4,902,948 | A | * | 2/1990 | Sherman .............. G05D 1/0265 318/580 |
| 4,919,224 | A | * | 4/1990 | Shyu ..................... A01D 34/008 180/168 |
| 5,032,994 | A | | 7/1991 | Wellman |
| 5,036,935 | A | * | 8/1991 | Kohara ................ G05D 1/0265 180/168 |
| 5,040,116 | A | | 8/1991 | Evans, Jr |
| 5,068,790 | A | | 11/1991 | Wellman |
| 5,068,791 | A | * | 11/1991 | Klopfleisch .......... G05D 1/0265 701/23 |
| 5,091,855 | A | * | 2/1992 | Umehara ............. G05D 1/0265 701/23 |
| 5,111,401 | A | | 5/1992 | Everett, Jr |
| 5,127,486 | A | * | 7/1992 | Yardley .................... B62D 1/28 180/168 |
| 5,175,480 | A | * | 12/1992 | McKeefery .......... G05D 1/0265 180/168 |
| 5,187,664 | A | * | 2/1993 | Yardley ................ G05D 1/0265 180/167 |
| 5,245,335 | A | | 9/1993 | Hill |
| 5,258,911 | A | | 11/1993 | Wellman |
| 5,281,901 | A | * | 1/1994 | Yardley ................ G05D 1/0265 318/587 |
| 5,341,130 | A | | 8/1994 | Yardley |
| 5,404,087 | A | | 4/1995 | Sherman |
| 5,508,731 | A | * | 4/1996 | Kohorn .................. H04H 60/94 725/23 |
| 5,519,296 | A | | 5/1996 | Day |
| 5,650,703 | A | * | 7/1997 | Yardley ................ G05D 1/0265 180/167 |
| 5,759,101 | A | * | 6/1998 | Von Kohorn .......... G09B 7/063 348/E7.024 |
| 5,778,327 | A | | 7/1998 | Simmons |
| 5,869,910 | A | * | 2/1999 | Colens .................... H02J 50/90 307/104 |
| 5,938,710 | A | | 8/1999 | Lanza |
| 6,445,984 | B1 | | 9/2002 | Kellogg |
| 8,172,033 | B2 | | 5/2012 | Corbett |
| 8,406,949 | B2 | | 3/2013 | Kondo |
| 8,433,467 | B2 | * | 4/2013 | Ross-Martin ........ G05D 1/0255 701/23 |
| 8,634,960 | B2 | * | 1/2014 | Sandin .................... B60L 50/66 700/258 |
| 8,751,147 | B2 | | 6/2014 | Colwell |
| 8,983,649 | B2 | | 3/2015 | Checketts et al. |
| 9,607,734 | B2 | | 3/2017 | Gundel |
| 10,333,047 | B2 | * | 6/2019 | Gilbert .................... C04B 35/45 |
| 2001/0003099 | A1 | * | 6/2001 | Von Kohorn ........ H04N 7/0806 463/16 |
| 2003/0023356 | A1 | * | 1/2003 | Keable ................ G05D 1/0265 701/23 |
| 2007/0140195 | A1 | * | 6/2007 | Kaftan .................. H04W 88/08 370/338 |
| 2010/0145550 | A1 | * | 6/2010 | Ross-Martin ........ G05D 1/0255 701/2 |
| 2010/0279582 | A1 | | 11/2010 | Bailly |
| 2010/0300788 | A1 | * | 12/2010 | Cox ........................ B61L 3/225 180/167 |
| 2011/0202307 | A1 | * | 8/2011 | Petereit ................ A01D 34/008 702/150 |
| 2012/0119575 | A1 | * | 5/2012 | Kurs ....................... B60L 53/63 307/9.1 |
| 2012/0239224 | A1 | * | 9/2012 | McCabe .................. B66F 9/063 701/2 |
| 2015/0031975 | A1 | * | 1/2015 | Atalar ...................... A61N 1/05 606/41 |
| 2016/0100035 | A1 | * | 4/2016 | Martis ..................... H04L 67/34 709/203 |
| 2017/0146622 | A1 | * | 5/2017 | Yang ................... G01R 33/3628 |
| 2018/0094935 | A1 | | 4/2018 | O'Brien |
| 2018/0304752 | A1 | * | 10/2018 | Duprat ................. G05D 1/0265 |
| 2018/0339703 | A1 | * | 11/2018 | Nix ....................... G05D 1/0223 |
| 2019/0138025 | A1 | * | 5/2019 | Crandall ................. E04H 6/426 |

OTHER PUBLICATIONS

European Patent Office, Extended European Search Report, Application No. 19158132.1, dated Jun. 27, 2019, 7 pages.
Chafkin, M., et al., 2017 "These Truckers Work Alongside the Coders Trying to Eliminate Their Jobs" [online] Bloomberg.com. Available at: https://www.bloomberg.com/news/features/2017-06-22/these-truckers-work-alongside-the-coders-trying-to-eliminate-their-jobs [Accessed Feb. 26, 2019].

* cited by examiner

WIRE GUIDANCE AND REMOTE OPERATION FOR MATERIAL HANDLING VEHICLES

CROSS-REFERENCES TO RELATED APPLICATIONS

The present application is based on, claims priority to, and incorporated herein by reference in its entirety U.S. Provisional Patent Application No. 62/632,760, filed on Feb. 20, 2018, and entitled "Wire Guidance and Remote Operation for Material Handling Vehicles."

STATEMENT REGARDING FEDERALLY SPONSORED RESEARCH

Not Applicable.

BACKGROUND

Autonomous vehicles are becoming increasingly popular in the material handling industry. An autonomous system replaces a human operator with a computer suite of sensors that allow the autonomous vehicle to localize and make basic decisions based on a set of instructions defined by a programmer. In some applications, the autonomous vehicle is supplemented with a Warehouse Management System (WMS) to provide guidance and instructions to the autonomous vehicle.

In some applications, wire guidance navigation systems are used to direct the autonomous vehicles. The autonomous vehicles use a wire embedded in a warehouse floor to steer the material handling vehicle. The wire includes a radio frequency signal that is sensed by a truck control system (TCS), which uses the signal to steer the truck precisely in line with the wire.

Wire guidance navigation has proven reliable, but includes limitations. The installation of wires incurs a substantial cost. Notches must be cut into the floor to accommodate a wire, and then must be filled with epoxy. While this provides a robust installation, it can be both expensive and inflexible. Any necessary maintenance or modification to the installed system can be time-intensive and costly. Additional navigation equipment can be required to send and receive data from the WMS, which can cause signal interference amongst the various electronic devices present in a warehouse.

In addition to wire guidance systems built into the floor, almost all WMS use some kind of broadcast system to convey information to and from the truck. Typically this is WiFi or broadcast of Radio Frequency (RF) that propagates in straight lines. This method works only because the broadcast signal bounces off surfaces and the information flow is asynchronous, not real time. That is, when a material handling vehicle happens to pass through an area with good broadcast RF, it will exchange some information with the WiFi broadcast system. This is acceptable for handling small amounts of asynchronous information flow; for example truck location to the WMS and directions to move a pallet from the WMS to the truck.

BRIEF SUMMARY

The present disclosure relates generally to wire guidance and remote operation for vehicles. Specifically, the present disclosure relates to systems and methods for guiding and operating material handling vehicles through a warehouse.

In some aspects, a wire guidance system according to the present disclosure may be used with an autonomous or semi-autonomous vehicle. The wire guidance system can include optical guidance as well, and can allow for two-way communication between a material handling vehicle and a Warehouse Management System.

In one aspect, the present disclosure provides a material handling vehicle guidance system. The material handling vehicle guidance system includes a first conductive member and a second conductive member electrically coupled to the first conductive member. The second conductive member extends parallel to the first conductive member to define a loop. The first conductive member and the second conductive members are coupled to a shielded cable connector. An electrical current source supplies current to the first conductive member in a first direction and supplies current to the second conductive member in a second direction opposite the first direction. The opposing currents produce a narrowcast frequency signal that is detectable between the first conductive member and the second conductive member.

In another aspect, the present disclosure provides a method of controlling a material handling vehicle in a warehouse. The method includes passing a current through a loop formed of a first conductive member and a second conductive member. The first conductive member and the second conductive member extend approximately parallel to one another to supply current in a first direction and a second direction substantially opposing the first direction. Navigational data is communicated to a material handling vehicle by transmitting a narrowcast radio frequency from the loop to an antenna coupled to the material handling vehicle.

In another aspect, the present disclosure provides a material handling vehicle. The material handling vehicle includes a body defining a frame that has a base. A receiving and transmitting antenna is coupled to the base, and extends downward from the base. The antenna is configured to detect a narrowcast radio frequency signal generated between a first conductive member and a second conductive member below the frame. An optical detector coupled to the base extends downward from the base as well. The optical detector and the receiving and transmitting antenna are electrically coupled to a truck control system. The truck control system is configured to adjust steering of the material handling vehicle based upon data received from the antenna and the optical detector.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Corresponding reference characters indicate corresponding parts throughout several views. Although the drawings represent embodiments of the present disclosure, the drawings are not necessarily to scale and certain features may be exaggerated in order to better illustrate and explain the embodiments of the present disclosure.

DETAILED DESCRIPTION

The invention will now be described more specifically with reference to the following embodiments. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Generally, the present disclosure provides systems and methods for remotely controlling and operating material handling vehicles. While the systems and methods for remotely controlling and operating vehicles are discussed only with respect to material handling vehicles, it should be appreciated that the various aspects of the disclosure can be applied to other vehicles as well.

Figure 1:
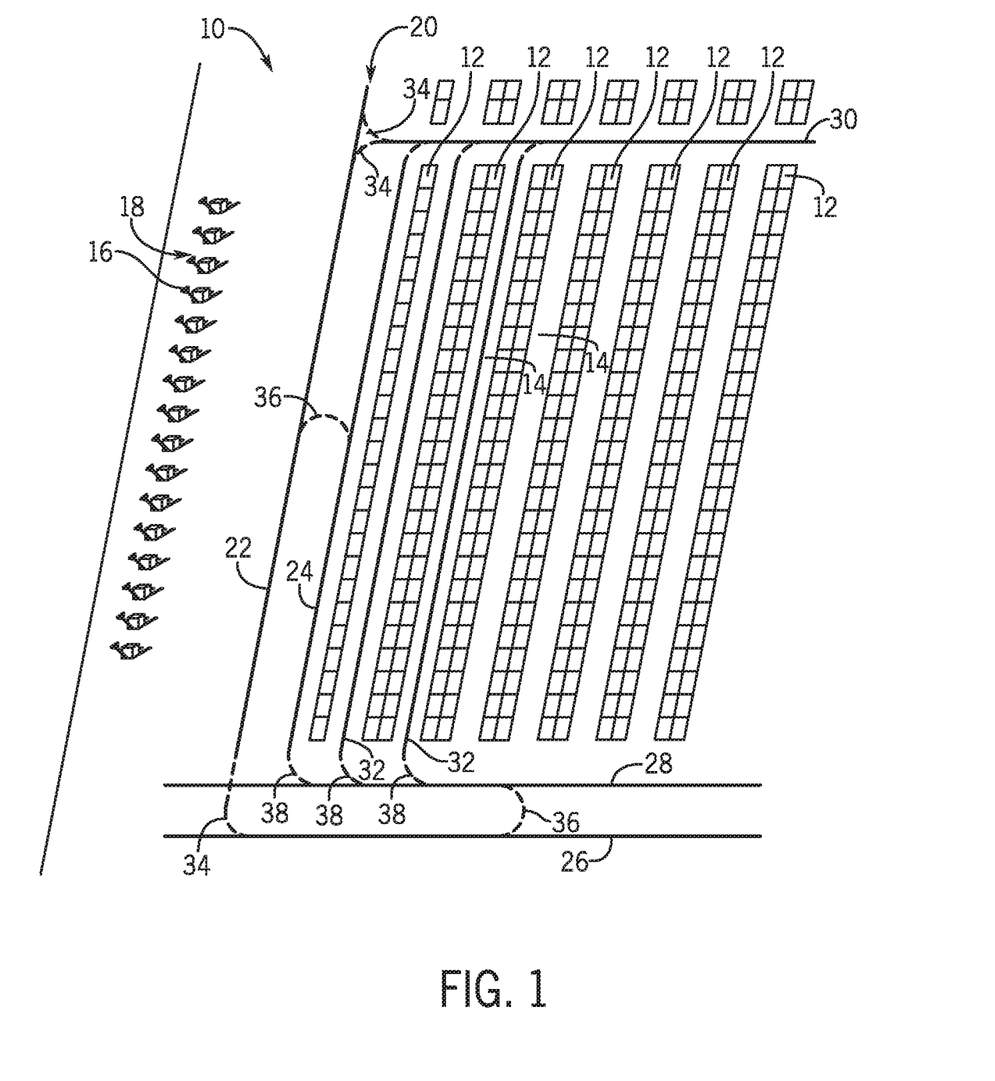
FIG. 1 a plan view of a warehouse incorporating a wire guidance system in accordance with an aspect of the disclosure.

FIG. 1 illustrates one non-limiting example of a warehouse 10 according to the present disclosure. The warehouse 10 includes several racks 12 spaced apart from one another that extend through the warehouse 10 to define aisles 14. The racks 12 may store pallets (not shown) or other items that can be retrieved or moved by one or more material handling vehicles 16 present within a fleet 18.

A network of wire loops 20 extends throughout the warehouse 10 to provide wire guidance to one or more material handling vehicles 16 that operate within the warehouse 10. The network of wire loops 20 provide an electrical signal to the material handling vehicles 16, which helps maintain the vehicles 16 centered over the wire loops 20 during operation. The network of wire loops 20 can be placed in electrical communication with a Warehouse Management System (WMS), which can provide signals to the wire loops 20 to direct the material handling vehicles 16 through the warehouse 10.

The network of wire loops 20 can be arranged to allow rapid and precise movement of material handling vehicles 16 throughout the entire warehouse 10. An outer perimeter can be partially established by a first wire loop 22, a second wire loop 24 extending approximately parallel to the first wire loop 22, a third wire loop 26 extending perpendicularly to the first wire loop 22, and a fourth wire loop 28 extending approximately parallel to the third wire loop 26. In some aspects, the first wire loop 22, second wire loop 24, third wire loop 26, and fourth wire loop 28 are positioned outward from the racks 12, and form a primary material handling vehicle path throughout the warehouse 10.

A crossing loop 30 can extend away from the outer perimeter of the network 20 (e.g., from the first loop 22), which can extend perpendicularly to the racks 12 and aisles 14. In some aspects, the crossing loop 30 can be used to navigate the material handling vehicle 16 through the warehouse until it reaches a desired aisle loop 32. In some aspects, each aisle 14 includes an aisle loop 32 extending approximately parallel to the racks 12 that define the aisle 14. The aisle loop 32 can extend through a portion of the aisle 14 to guide a material handling vehicle 16 within the aisle 14. For example, the aisle loop 32 can extend the entire length of the aisle 14.

Optical guidance can be provided with each wire loop in the network 20. For example, each wire loop in the network 20 can be painted over with a visible stripe. The visible stripe can be detected by an optical detector (e.g., the optical detector 74, shown in FIG. 5) present on the material handling vehicle 16. The visible stripe may have a color or pattern that indicates which aisle of the warehouse 10 the wire loop is located. The optical detector can be a digital camera or light sensor with an integrated light source oriented at the floor to sense the visible stripe. The visible stripe can be simply painted on the floor or it can be a tape attached to the floor. In some aspects, the paint or tape can be applied on top of a wire loop tape can contain a wire loop. In some aspects, a wire loop can be arranged on an adhesive side of the tape or embedded within the tape before the tape is applied to the floor.

In addition to the visible stripes present above each wire loop in the network 20, transitional stripes 34, 36, 38 can extend between the wire loops 22, 24, 26, 28, 30, 32 in the network 20. In some aspects, a gap exists between each wire loop in the network 20. When a material handling vehicle 16 is given a task (e.g., a WMS assigns the material handling vehicle 16 to retrieve an item from a specific location on a rack 12), the material handling vehicle 16 may need to traverse several wire loops 22, 24, 26, 28, 30, 32 within the warehouse 10 to arrive at the specific location on the rack 12. Transitional stripes 34, 36, 38 can provide optical indication and/or guidance to a material handling vehicle 16 as it transitions from one wire loop (e.g., the first wire loop 22) to another wire loop (e.g., the third loop 26). As the material handling vehicle 16 approaches the transitional stripe 34, 36, 38, it can optically detect the path it should take to transition from being guided by one wire loop to the next wire loop.

The transitional stripes 34, 36, 38 can be provided in several locations throughout the network 20. For example, transitional stripes 34 can be provided between each wire loop 22, 24, 26, 28 in the outer perimeter of the network 20. The transitional stripes 34 may form a smoothly curving arc that extends about 90 degrees to tangentially direct a material handling vehicle 16 from one wire loop to another wire loop. Transitional stripes 36 can also extend between the wire loops 22, 24, 26, 28 to optically guide a material handling vehicle 16 through a U-turn. A 180 degree arc can extend between two parallel loops (e.g., the first and second wire loops 22, 24, or the third and fourth wire loops 26, 28) to guide a material handling vehicle 16 as it reverses direction onto an adjacent wire loop. Transitional stripes 38 can also extend away from the aisle loops 32 toward the outer perimeter loops 22, 24, 26, 28 and the crossing loop 30. The transitional stripes 38 can be defined by a smoothly curving arc extending approximately 90 degrees between each loop.

Figure 2:
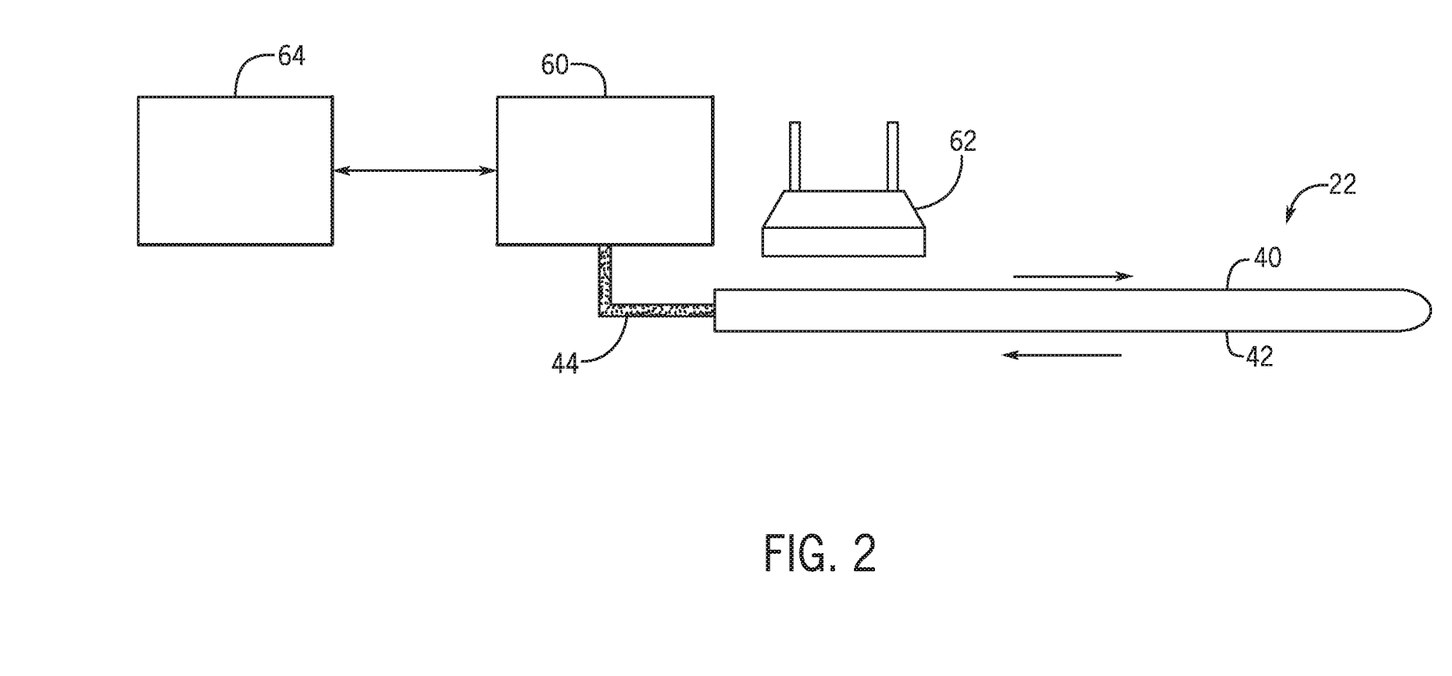
FIG. 2 is a schematic view of a communication system coupled to the wire guidance system of FIG. 1.

FIGS. 2-5 illustrate the wire loop construction and function. Each wire loop, such as the first wire loop 22 shown in FIG. 2, is constructed of two conductive members 40, 42, which are electrically coupled to one another to define a loop. Each of the conductive members 40, 42 extend away from a shielded cable connector 44. The first conductive member 40 and the second conductive member 42 can extend away from the shielded cable connector 44 in a substantially parallel manner. In some aspects, the first conductive member 40 and the second conductive member 42 are each placed into notches 45, 46 formed or cut in the warehouse floor 48. Epoxy can be filled in around the conductive members 40, 42 to secure them within the notches 45, 46 in the floor 48. In some aspects, a single notch (not shown) can accommodate both conductive members 40, 42, which may reduce installation costs. The conductive members 40, 42 can be constructed from metal wires, metal foil, and/or conductive paint where appropriate. The conductive paint can include an epoxy with metal particles.

Figure 3:
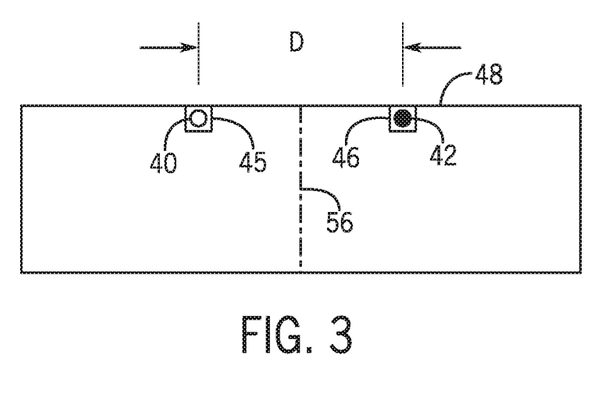
FIG. 3 is cross-sectional view of a warehouse floor having the wire guidance system of FIG. 1 installed therein, taken along cut line 3-3 in FIG. 1.

The first conductive member 40 and the second conductive member 42 can be spaced apart from one another by a distance D. In some aspects, the distance D can range between about 0.05 cm (0.02 inches) and about 10.2 cm (4.0 inches). The distance D can be chosen based upon the desired communication frequency used in the warehouse 10. In some aspects, the distance D can be selected to be about four times larger than the wavelength of the communication frequency used in the warehouse 10, which may help transmit and receive signals at the communication frequency. For example, a warehouse 10 operating on a 23.6 GHz frequency may use conductive members 40, 42 spaced apart by a distance D of about 5.1 cm (2.0 inches). A variety of high frequencies can be used to communicate signals through the conductive members 40, 42. For example, frequencies between about 1 GHz to greater than 200 GHz can be transmitted through and received by the conductive members 40, 42. Standard frequencies such as 2.4 GHz, 3.6 GHz, 5 GHz, or 60 GHz may also be used.

When electrical current is supplied to the wire loop 22, the current travels along the first conductive member 40 in a first direction away from the shielded cable connector 44, passes to the second conductive member 42, and returns toward the shielded cable connector 44 along the second conductive member 42 in a second direction substantially opposite of the first direction. The opposing currents produce electromagnetic fields 50, 52, which emanate outwardly from the conductive members 40, 42 at the current frequency to produce a near field signal.

Figure 4:
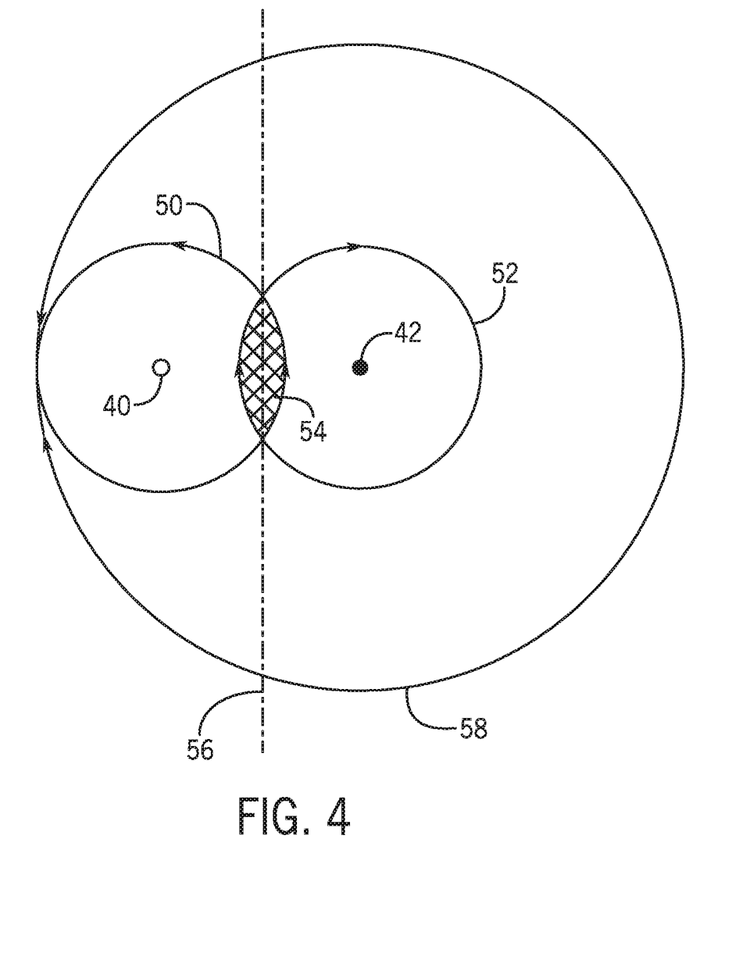
FIG. 4 is a schematic view of the electromagnetic fields produced by current passing through the wire guidance system of FIG. 1.

Because the currents passing through the first conductive member 40 and the second conductive member 42 oppose one another, the electromagnetic fields 50, 52 produced by the currents can extend in opposite directions. As shown in FIG. 4, for example, the current flowing through the first conductive member 40 can produce an electromagnetic field 50 extending counterclockwise about the first conductive member 40, while the second conductive member 42 can produce an electromagnetic field 52 extending clockwise about the second conductive member 42.

The positioning of the conductive members 40, 42 relative to one another produces a narrowcasting signal, which may only be detectable in an area 54 between and above the two conductive members 40, 42, where it is strongest. As shown in FIG. 4, the electromagnetic fields 50, 52 extend in opposing directions. Although the electromagnetic fields 50, 52 produced by the first conductive member 40 and the second conductive member 42 oppose one another, the electromagnetic fields 50, 52 are additive in the area 54 directly between and above the two conductive members 40, 42. Because both fields 50, 52 extend in a similar direction in the additive area 54, they can produce a strong radio frequency signal that can be detected or received by an antenna or other receiving device present above and between the two conductive members 40, 42. The radio frequency signal is strongest along the centerline 56 between the two conductive members 40, 42.

Outside of the additive area 54, the electromagnetic fields 50, 52 oppose one another, which includes a canceling effect on any resultant radio frequency signal produced by the current passing through the conductive members 40, 42. The resultant radio frequency signal becomes weaker further away from the conductive members 40, 42, and may be undetectable in these areas. The resultant electromagnetic field 58 demonstrates the canceling effect of the electromagnetic fields 50, 52, which occurs outside the area 54 between the conductive members 40, 42. The first wire loop 22 (and other loops 24, 26, 28, 30, 32 within the network 20) functions as a narrowcasting network, where a strong signal can be detected only within a confined area (i.e., the area 54 between and above the conductive members 40, 42), rather than a broadcasting network, where radio frequency power is distributed throughout a larger area. The canceling effect of the resultant electromagnetic field 58 can reduce the amount of interference introduced into other communication systems used within the warehouse 10, such as cellular or WiFi. The metal racks 12 in the warehouse 10 can also reduce the amount of interference produced by the resultant electromagnetic fields 58 produced by the wire loops in the network 20.

The current and/or resulting radio frequency signal can be supplied to the conductive members 40, 42 from an outside source, such as a Warehouse Management System (WMS). The shielded cable connector 44 can be coupled to a local WiFi node 60 (see FIG. 2). The local WiFi node 60 can be a WiFi unit 62 based on the IEEE 802.11 standards, and can use the wire loop (e.g., first wire loop 22) as its antenna. The local WiFi node 60 can be a node on the warehouse Ethernet 64, which can receive data from a network hub computer (not shown). When the local WiFi node 60 receives a signal from the network hub computer or WMS, the local WiFi node 60 may demodulate the signal to extract information from the received signal. Depending upon the type of signal received, the local WiFi node 60 can transmit a high frequency radio frequency signal through the shielded cable connector 44 and onto the first and second conductive members 40, 42, which may transmit the signal upward, where it can be detected by a material handling vehicle 16. In some aspects, the local WiFi node 60 contains a superheterodyne receiver to receive an incoming signal from the WMS and convert the received signal into a frequency that can then be passed onto the conductive members 40, 42 of the wire loop.

Figure 5:
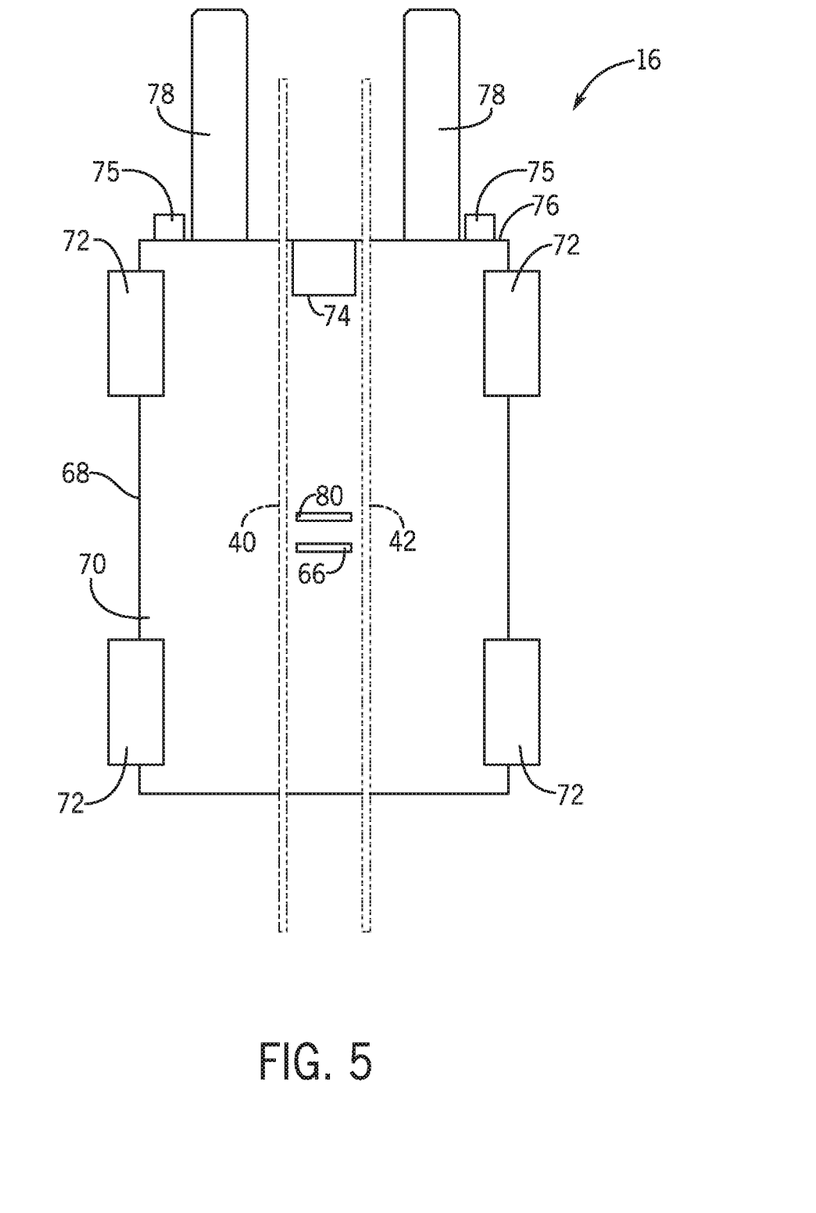
FIG. 5 is a bottom view of a material handling vehicle centered over the wire guidance system of FIG. 1.

The radio frequency signal carried by the conductive members 40, 42 can be received by an antenna 66 coupled to the material handling vehicle 16, as shown in FIG. 5. In some aspects, the antenna 66 is coupled to a base 70 of a steel frame 68 that can partially define the material handling vehicle 16. The antenna 66 can be positioned between each of the wheels 72, approximately centered on the base 70 of the steel frame 68. In some aspects, the antenna 66 is electrically coupled to a Truck Control System (TCS) (not shown), which can demodulate the radio frequency signal detected by the antenna 66 and use the information contained within the signal to execute various material handling vehicle 16 functions. The TCS can include a Vehicle Manager (VM) that uses a micro-controller in communication with multiple field-programmable gate array (FPGA) logic chips to communicate with and control various subsystems (e.g., the steering motor, lift pump, traction motor, etc.) on the material handling vehicle 16 through a digital bus. The TCS can also include relays, display modules, badge readers, RFID chip readers, proximity sensors, and other electronic systems present within the material handling vehicle 16, such that communication with the TCS can allow the material handling vehicle 16 to be externally controlled. For example, the radio frequency signal carried by the conductive members 40, 42 may contain navigation instructions, which can be received and processed by the TCS. The VM within the TCS can then navigate the material handling vehicle 16 according to the navigation instructions received by the TCS, and can move the material handling vehicle 16 throughout the warehouse 10. In some aspects, the radio frequency signal can include remote controlling instructions provided by an operator, who could then operate the material handling vehicle 16 using a computer (e.g., a personal laptop) connected to the warehouse Ethernet 64. This may allow an operator to semi-autonomously operate a material handling vehicle 16 from a location outside the warehouse 10 entirely.

In addition to receiving information, the strength of the signal detected by the antenna 66 can be used to help locate the material handling vehicle 16 above the wire loop 22. As indicated previously, the highest radio frequency signal is present directly between the two conductive members 40, 42, and the strength of the signal received by the antenna 66 is directly correlated to the antenna's 66 (and material handling vehicle's 16) position relative to the two conductive members 40, 42 (i.e., the signal may be strongest along the centerline 56 in the narrowcasting area 54). In some aspects, the TCS of the material handling vehicle 16 can be programmed with a threshold signal amplitude, which corresponds to the amplitude of a signal that would be produced if the material handling vehicle 16 is properly located above a wire loop (e.g., the first wire loop 22). The TCS can continuously monitor the material handling vehicle's 16 position relative to the loop by comparing the signal received by the antenna 66 to the threshold value stored within the TCS. If the value falls below the predetermined "acceptable" amplitude, the TCS can adjust the steering of the material handling vehicle 16 until a value above the amplitude threshold is received by the antenna 66. This can maintain the material handling vehicle 16 aligned properly with the wire loop. In other aspects, several antennae 66 can be used to detect the lateral distance of the material handling vehicle 16 relative to the loop, as discussed in U.S. Pat. No. 6,445,984, which is hereby incorporated by reference in its entirety.

An optical detector 74 can be coupled to the base 70 of the steel frame 68 to further guide the material handling vehicle 16 throughout the warehouse. In some aspects, the optical detector 74 can be a light sensor with an integrated light source that provides visible white light, visible light of a specific color, or infrared light. The light sensor can detect light reflected from the visible stripe of one of the wire loops 22, 24, 26, 28, 30, 32 and/or one of the transitional stripes 34, 36, 38. The light sensor can distinguish the color of the reflected light, which may be used to determine a location of the material handling vehicle 16 in the warehouse 10 and/or on one of the wire loops 22, 24, 26, 28, 30, or 32. The color of the reflected light may indicate if the optical sensor 74 is positioned over visible bars 90 of FIG. 7. In other aspects, the optical detector 74 can be a camera that can detect a color or pattern. The camera can have an integrated light source that provides visible white light, visible light of a specific color, or infrared light. The optical detector can detect color from tape, paint, or concrete dye with or without a top coating of protective epoxy, allowing for colors and/or patterns to be marked in a variety of manners.

The optical detector 74 can be positioned in line with the antenna 66, and can supplement, or completely replace, the wire guidance provided by the conductive members 40, 42. In some aspects, the optical detector 74 is positioned near a leading end 76 of the material handling vehicle 16. For example, the optical detector 74 can be positioned near one or more forks 78 that extend forward of the steel frame 68 of the material handling vehicle 16. The optical detector 74 can be used to optically detect the position the material handling vehicle 16 is in currently, as well as to identify obstacles, turns, or the end of an aisle 14 that may be in front of the material handling vehicle 16.

The optical detector 74 can help direct the material handling vehicle 16 to stay properly positioned above the wire loop. For example, if the antenna 66 detects that the detected radio frequency signal has fallen below the necessary amplitude threshold, the optical detector 74 can optically detect which direction the material handling vehicle 16 must steer in order to be properly aligned with the wire loop once more. The visible stripes present above the loops in the network 20 provide easily detectable markers for the optical detector 74 to sense. Data taken by the optical detector 74 can be communicated to the TCS, which adjusts the steering of the material handling vehicle 16 as necessary.

The optical detector 74 can help the material handling vehicle 16 transition between the different wire loops in the network 20 to reach a desired destination. When the optical detector 74 detects that a transitional stripe 34, 36, 38 is approaching, the optical detector 74 can alert the TCS, which can temporarily disable wire guidance. Using the optical detector 74, the TCS can smoothly steer the material handling vehicle 16 along the transitional stripes 34, 36, 38, until the material handling vehicle 16 is once again centered over a wire loop within the network 20. Once the optical detector 74 detects that the material handling vehicle 16 is positioned above a wire loop, the TCS can reinitiate the wire guidance system.

In some aspects, a transmitter 80 can also be coupled to the material handling vehicle 16. The transmitter 80, like the antenna 66, can be coupled to the base 70 of the steel frame 68. The transmitter 80 can be positioned between each of the wheels 66, approximately centered on the base 70 of the steel frame 68. The transmitter 80 can be placed in electrical communication with the TCS, and can be used to transmit information from the TCS to the wire loop 22 positioned below the material handing vehicle 16. The transmitter 80 may have one or more coils configured to transmit RF energy to induce currents at a predetermined frequency in the conductive members 40, 42 and transmit a signal to the WiFi node 60. The signal may have a frequency ranging from 1 GHz to 100 GHz. The underside of the material handling vehicle 16 can prevent the RF energy from spreading away from the conductive members 40, 42 and thus interfering with components of the warehouse 10. The opposing currents can carry a signal with information about the material handling vehicle 16 to the WiFi node 60. For example, the transmitter 80 could transmit the material handling vehicle's 16 position within the warehouse 10, based upon readings from the optical detector 74 and the antenna 66. In some aspects, the transmitter 80 could communicate with the wire loop 22 (which communicates with the WMS) that an assigned task (e.g., retrieving an item from a specific rack 12 within the warehouse 10) has been completed, and that the material handling vehicle 16 is ready to be assigned a new task. In still other aspects, the material handling vehicle 16 could use the transmitter 80 to notify the WMS that an unexpected scenario has been encountered, and the material handling vehicle 16 desires assistance from an operator. In some embodiments, the transmitter 80 and antenna 66 are electrically coupled to one another. In some embodiments, the transmitter 80 and antenna 66 may be a one or more receiving and transmitting antennas each performing at least a portion of the functions of the transmitter 80 and antenna 66.

If the material handling vehicle 16 transmits a radio frequency signal to the conductive members 40, 42 below, the radio frequency signal can be carried from the loop to the shielded cable connector 44, and to the local WiFi node 60. In some aspects, the local WiFi node 60 includes a demodulator, which can extract the information from the radio frequency signal received from the material handling vehicle 16. The local WiFi node 60 may then transmit a signal through the WiFi unit 62 to the warehouse Ethernet 64, which may be coupled with the WMS. The WMS can receive the signal, demodulate it, and determine the appropriate course of action to respond to the information received from the material handling vehicle 16. For example, the WMS can assign a new task to the material handling vehicle 16 by sending a signal through the local WiFi node 60, through the shielded cable connector 44, and onto the conductive members 40, 42, where it can be detected by the material handling vehicle 16. In some aspects, the antenna 66 and transmitter 80 operate on different channels, so that two-way communication through the conductive members 40, 42 and the material handling vehicle 16 can occur simultaneously. Both the signal transmitted from the material handling vehicle 16 and the signal transmitted to the material handling vehicle 16 may be present in the conductive members 40, 42. The demodulator may be able to separate the signal transmitted from the material handling vehicle 16 and the signal transmitted to the material handling vehicle 16 in order to implement two-way communication. For example, the demodulator may receive a single combined current via the shielded cable connector 44 with both the signal transmitted from the transmitter 80 to the WiFi node 60 and the signal transmitted from the WiFi node 60 to the antenna 66. The demodulator can then filter out a signal corresponding to the carrier frequency of the channel the transmitter 80 is operating on and then process the information transmitted from the material handling vehicle 16. In other aspects, the transmitter 80 and the antenna 66 may operate on the same channel while still allowing two-way communication to occur. For example, the WiFi node 60 can use an appropriate technique such as a full-duplex or simultaneous transmission and reception (STR) technique to detect appropriate signals and implement two-way communication.

High speed two-way communication between the material handling vehicle 16 and the WMS can enable the autonomous material handling vehicle 16 to be selectively controlled by an operator, who may be present remotely from the material handling vehicle 16. For example, when the material handling vehicle's 16 autonomous control system (e.g., the TCS) detects an obstacle that affects its navigation, it may transmit a signal along the network 20 that it requests assistance. An operator positioned at a computer in communication with the network 20 can accept the assistance request, which can then provide remote control of the material handling vehicle 16. Conductive members 40, 42 of the loop can be used with the antenna 66 and transmitter 80 to send and receive high frequency signals between the computer and the material handling vehicle 16 to enable the operator to communicate with and control the material handling vehicle 16. The computer can display a live video feed being taken from one or more video cameras 75 on the material handling vehicle 16, which can supply the operator with a field of view in front of the material handling vehicle 16. The video cameras 75 can be positioned around the material handling vehicle 16 to provide views that might be difficult or even impossible to see by an operator seated within the material handling vehicle 16. For example, video cameras 75 can be directed toward the forks 78, which can allow an operator to align the forks 78 with a pallet, regardless of the pallet's height relative to the material handling vehicle 16. Using the optical footage, the operator can then control the material handling vehicle 16 and navigate it through the scenario that originally created the request for assistance. Once the material handling vehicle 16 includes been successfully maneuvered by the remote operator, control can be returned to the TCS of the material handling vehicle 16, and autonomous operation can resume. Using a central computer with the network 20, multiple material handling vehicles 16 can be selectively controlled by a single remote operator, which can reduce labor costs.

In some aspects, additional antennae (not shown) may be coupled to the material handling vehicle 16 to receive or communicate information throughout the warehouse 10. For example, WiFi units 62 may broadcast vehicle instructions throughout the warehouse, which can be received and processed by the TCS of the material handling vehicle 16. The broadcast WiFi can also be used to determine the material handling vehicle's 16 position along a wire guidance loop (e.g., wire loops 22, 24, 26, 28, 30, 32). In some aspects, the same instructions can be transmitted to a material handling vehicle 16 through both broadcast WiFi and the loop network 20. The time delay between receiving a broadcast radio signal and receiving the same signal through a wire loop can be measured, and the calculated time delay between receiving the signals can determine the location of the material handling vehicle 16 relative to the wire loop. In some aspects, time delay measurement can be used to supplement or replace the optical detector 74 to direct the material handling vehicle 16 throughout the warehouse 10.

Figure 6:
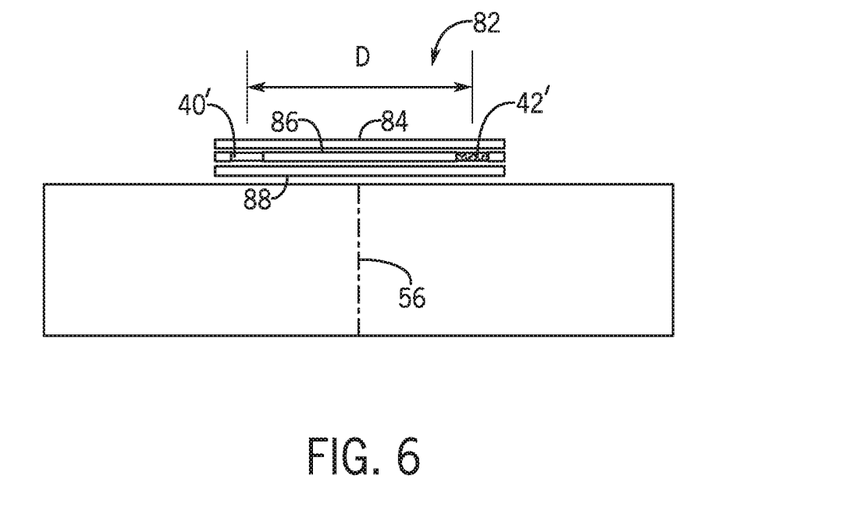
FIG. 6 is an exploded view of a warehouse floor and tape incorporating a wire guidance system in accordance with another aspect of the disclosure.
Figure 7:
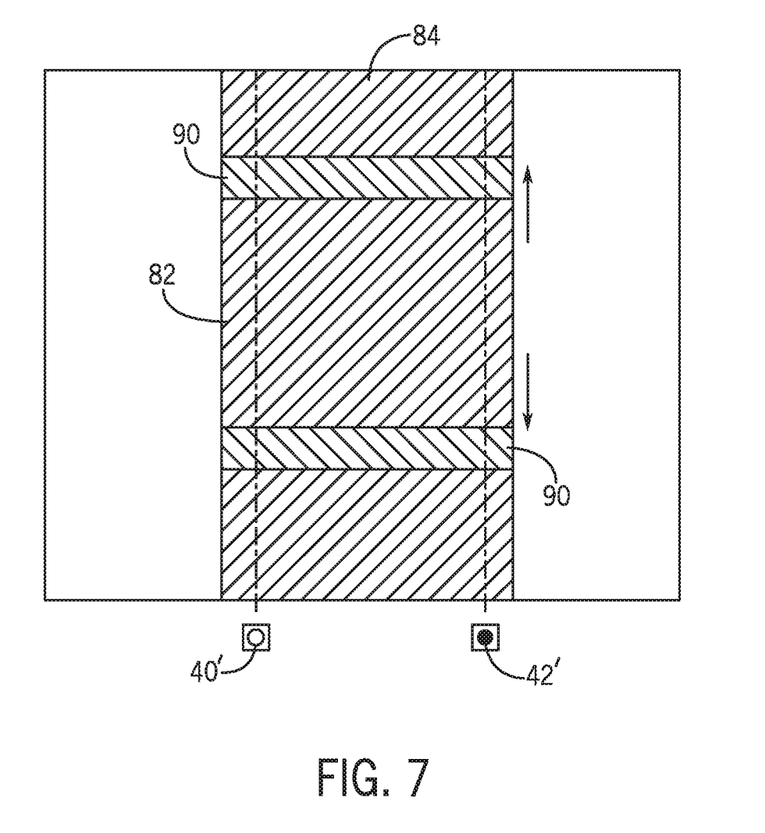
FIG. 7 is a top view of the wire guidance system of FIG. 6.

FIGS. 6 and 7 show another aspect of a wire loop 82 that can be incorporated into the warehouse network 20. Instead of creating notches (e.g., notches 45, 46, shown in FIG. 3) in the warehouse floor 48, first and second conductive members 40', 42' in the form of metal foil conductors can be adhesively coupled to the warehouse floor 48. The wire loop 82 can be a tape having multiple layers 84, 86, 88 that secure the wire loop 82 to the warehouse floor 48 while also protecting the metal foil of the first and second conductive members 40', 42'. The conductive members 40', 42' are electrically coupled to one another to form a wire loop 82. Similar to the first and second conductive members 40, 42, the first and second conductive members 40', 42' are spaced apart by the distance D. Like the first wire loop 22 shown in FIG. 2, the wire loop 82 can be electrically coupled to a shielded cable connector 44, as well as a local WiFi node 60, WiFi unit 62, warehouse Ethernet 64, and a WMS.

A top layer 84 can include a visible stripe that can be readily detected by the optical detector 74 of the material handling vehicle 16. In some aspects, the top layer 84 also includes visible bars 90 spaced apart about the top layer 84. The visible bars 90 can extend across the top layer 84 to indicate distance on the wire loop 82. As a material handling vehicle 16 travels over the wire loop 82, the optical detector 74 can optically detect the visible bars 90, which can indicate the position of the material handling vehicle 16 relative to the wire loop 82. For example, the visible bars 90 can be spaced apart from one another every 0.6 meters (2 feet), and can be about 0.01 m (0.5 in) thick. The optical detector 74 can be used to count the number of bars traversed, which can be communicated to the wire loop 82, which can then be transmitted to the WMS. In other aspects, the visible bars 90 can be given different colors, which can correspond to different distances along the wire loop 82. If the material handling vehicle 16 is between two visible bars 90, the position of the material handling vehicle 16 on the wire loop 82 can be calculated using the number of rotations of the material handling vehicle's 16 wheels 72 or by using the time delay measurement technique discussed previously. Data can be broadcasted over the warehouse WiFi and through the wire loop 82, and the amount of time it takes for the antenna 66 of the material handling vehicle 16 to receive the data can be used to calculate the position of the material handling vehicle 16 on the wire loop 82.

Using aspects of the disclosure, remote operation of a material handling vehicle can be accomplished. The network of loops provides reliable two-way communication with material handling vehicles, which can transmit and receive information between the TCS and the WMS to effectively accomplish tasks within a warehouse automatically. Remote operators can be notified when material handling vehicles encounter a scenario outside of their working set of instructions, and can temporarily take over the operation of a material handling vehicle until the unforeseen scenario includes been resolved. Using the systems and methods disclosed herein, one remote operator may manage one or more material handling vehicles, which can reduce labor costs.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention includes been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A material handling vehicle guidance system, the material handling vehicle guidance system comprising:
    a first conductive member;
    a second conductive member electrically coupled to the first conductive member and extending parallel to the first conductive member to define a loop, the first conductive member and second conductive member being coupled to a shielded cable connector; and
    an electrical current source supplying current to the first conductive member in a first direction and supplying current to the second conductive member in a second direction opposite the first direction to produce a narrowcast radio frequency steering-control signal detectable in an area between the first conductive member and the second conductive member.

2. The material handling vehicle guidance system of claim 1, wherein the first conductive member and the second conductive member comprise metal wires.

3. The material handling vehicle guidance system of claim 1, wherein the first conductive member and the second conductive member comprise a conductive foil.

4. The material handling vehicle guidance system of claim 1, wherein the first conductive member and the second conductive member are spaced apart from one another by less than 8 cm.

5. The material handling vehicle guidance system of claim 1, wherein the current source supplies a current between 2.4 GHz and 60 GHz.

6. The material handling vehicle guidance system of claim 1, wherein the guidance system further comprises an antenna coupled to a material handling vehicle, the antenna being in electrical communication with the loop.

7. The material handling vehicle guidance system of claim 6, wherein the antenna is configured to transmit and receive information from the loop when the antenna is positioned between the first conductive member and the second conductive member.

8. The material handling vehicle guidance system of claim 1, wherein the shielded cable connector is coupled to a local WiFi node, the local WiFi node being coupled to a warehouse Ethernet.

9. The material handling vehicle guidance system of claim 1, further comprising an optical indicator positioned above the first conductive member and the second conductive member.

10. The material handling vehicle guidance system of claim 1, wherein a visible stripe extends between the first conductive member and the second conductive member to provide optical guidance.

11. The material handling vehicle guidance system of claim 10, further comprising a second loop, the second loop being spaced apart from the first conductive member and the second conductive member, a transitional stripe extending between the second loop and the first conductive member and the second conductive member.

12. The material handling vehicle guidance system of claim 10, further comprising an optical detector coupled to a material handling vehicle, the optical detector detecting a position of the visible stripe relative to the material handling vehicle and communicating with a truck control system (TCS) within the material handling vehicle to adjust an orientation of the material handling vehicle based upon the detected position of the visible stripe relative to the material handling vehicle.

13. A method for controlling a material handling vehicle in a warehouse, the method comprising:
    passing a current through a loop formed of a first conductive member and a second conductive member, the first conductive member and the second conductive member extending approximately parallel to one another to supply current in a first direction and a second direction substantially opposing the first direction to produce a narrowcast radio frequency steering-control signal detectable in an area between the first conductive member and the second conductive member; and communicating navigational data to a material handling vehicle by transmitting the narrowcast radio frequency from the loop to an antenna coupled to the material handling vehicle.

14. The method of claim 13, wherein the navigational data is communicated to the material handling vehicle by a Warehouse Management System (WMS), the Warehouse Management System being in electrical communication with the loop.

15. The method of claim 13, wherein the method further comprises transmitting data from the material handling vehicle to the loop using the antenna coupled to the material handling vehicle.

16. The method of claim 15, wherein the data transmitted to the loop from the material handling vehicle is communicated to a Warehouse Management System (WMS) through the loop.

17. The method of claim 13, wherein the antenna extends downward from a base of the material handling vehicle.

18. The method of claim 13, wherein the method further comprises optically detecting a position of the material handling vehicle relative to the loop using an optical detector.

19. The method of claim 18, wherein the optical detector extends downward from a base of the material handling vehicle.

20. The method of claim 19, wherein the method further comprises transmitting the data obtained by the optical detector from the antenna to the loop to communicate the position of the material handling vehicle within the warehouse.

21. The method of claim 18, where the step of optically detecting a position of the material handling vehicle relative to the loop using the optical detector is performed by optically detecting a relative position between the material handling vehicle and a visible stripe extending between the first conductive member and the second conductive member.

22. The method of claim 21, wherein the method further comprises communicating to a truck control system (TCS) on the material handling vehicle to adjust an orientation of the material handling vehicle relative to the loop based upon the detected relative position between the material handling vehicle and the visible stripe.

23. The method of claim 13, wherein the narrowcast radio frequency is defined by a frequency between 2 GHz and 60 GHz.

24. A material handling vehicle comprising:
a body defining a frame, the frame having a base;
a receiving and transmitting antenna coupled to the base, the receiving and transmitting antenna extending downward from the base, wherein the receiving and transmitting antenna is configured to detect a narrowcast radio frequency signal generated in an area between a first conductive member and a second conductive member below the frame; and
an optical detector coupled to the base and extending downward from the base, the optical detector and the receiving and transmitting antenna being electrically coupled to a truck control system, the truck control system being configured to adjust steering of the material handling vehicle based upon data received from the receiving and transmitting antenna and the optical detector.

25. The material handling vehicle of claim 24, further comprising a video camera coupled to the material handling vehicle, the video camera having a field of view extending outwardly from the body of the material handling vehicle.

26. The material handling vehicle of claim 25, wherein the video camera is placed in electrical communication with the receiving and transmitting antenna.

* * * * *